(12) United States Patent
Kinno et al.

(10) Patent No.: US 9,274,341 B2
(45) Date of Patent: Mar. 1, 2016

(54) HEAD MOUNTED DISPLAY

(71) Applicant: KABUSHIKI KAISHA TOSHIBA, Minato-ku, Tokyo (JP)

(72) Inventors: Akira Kinno, Kanagawa (JP); Aira Hotta, Kanagawa (JP); Akihisa Moriya, Kanagawa (JP); Takashi Sasaki, Kanagawa (JP); Haruhiko Okumura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 17 days.

(21) Appl. No.: 14/458,472

(22) Filed: Aug. 13, 2014

(65) Prior Publication Data
US 2015/0102982 A1     Apr. 16, 2015

(30) Foreign Application Priority Data
Oct. 10, 2013   (JP) .................. 2013-212909

(51) Int. Cl.
    *G02B 27/01*     (2006.01)
(52) U.S. Cl.
    CPC .... *G02B 27/0176* (2013.01); *G02B 2027/0152* (2013.01); *G02B 2027/0154* (2013.01); *G02B 2027/0178* (2013.01); *G02B 2027/0187* (2013.01)
(58) Field of Classification Search
    CPC ............... G02B 27/017; G02B 2027/0152; G02B 27/0172; G02B 27/0176; G02B 23/125; G02B 2027/0178; G02B 25/001; G06F 3/011; G06F 3/012; G06F 3/013; G06F 3/017; G06F 1/163; G06T 19/006
    USPC .................. 345/8, 633; 359/630, 13; 349/11
    See application file for complete search history.

(56) References Cited

U.S. PATENT DOCUMENTS

| | | | |
|---|---|---|---|
| 2007/0046889 A1* | 3/2007 | Miller | ............ G02C 3/003 351/62 |
| 2010/0246023 A1* | 9/2010 | Tanaka | ........... G02B 27/0176 359/630 |

FOREIGN PATENT DOCUMENTS

| | | |
|---|---|---|
| JP | 2007-097198 | 4/2007 |
| JP | 3143582 | 7/2008 |
| JP | 2009-065440 | 3/2009 |
| JP | 2009-089093 | 4/2009 |

\* cited by examiner

*Primary Examiner* — Koosha Sharifi-Tafreshi
(74) *Attorney, Agent, or Firm* — Amin, Turocy & Watson, LLP (57) ABSTRACT

According to one embodiment, a head mounted display includes a holder, a projector, an optical part, a weight, a detector, a first calculator, and a movement part. The holder includes a frame, a first temple, and a second temple. The first temple and the second temple are respectively connected to each end part of the frame. The projector is provided on the first temple. The projector emits light. The optical part is provided on the frame. The optical part reflects at least part of the light emitted from the projector. The weight is provided on opposite side of the projector. The detector detects tilt of the holder. The first calculator calculates an optimal position of the weight based on the tilt of the holder. The movement part changes the position of the weight according to the optimal position.

19 Claims, 7 Drawing Sheets

HEAD MOUNTED DISPLAY

CROSS-REFERENCE TO RELATED APPLICATIONS

This application is based upon and claims the benefit of priority from Japanese Patent Application No. 2013-212909, filed on Oct. 10, 2013; the entire contents of which are incorporated herein by reference.

FIELD

Embodiments described herein relate generally to a head mounted display.

BACKGROUND

There is known a head mounted display (HMD) with a display part provided in front of an eye of a user. In the HMD, the display part is provided on one side or both sides of a pair of glasses. Compared with conventional glasses, the HMD is heavier in the portion on the side of the user's eyes. This may disturb the weight balance of the glasses, and the glasses may be tilted in the left-right or front-back direction.

In this context, there is proposed a technique for adjusting the position of the barycenter of the head mounted display by providing a weight.

The position of the weight may be appropriate when wearing the HMD. However, when the user moves the head, the position may become inappropriate.

This may bring discomfort to the user when using the HMD.

DETAILED DESCRIPTION

In general, according to one embodiment, a head mounted display includes a holder, a projector, an optical part, a weight, a detector, a first calculator, and a movement part.

The holder includes a frame, a first temple, and a second temple.

The first temple and the second temple are respectively connected to each end part of the frame.

The projector is provided on the first temple. The projector emits light.

The optical part is provided on the frame. The optical part reflects at least part of the light emitted from the projector.

The weight is provided on opposite side of the projector.

The detector detects tilt of the holder.

The first calculator calculates an optimal position of the weight based on the tilt of the holder.

The movement part changes the position of the weight according to the optimal position.

Embodiments of the invention will now be described with reference to the drawings.

The drawings are schematic. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those previously described with reference to earlier figures are labeled with like reference numerals, and the detailed description thereof is omitted appropriately.

First Embodiment

Figure 1:
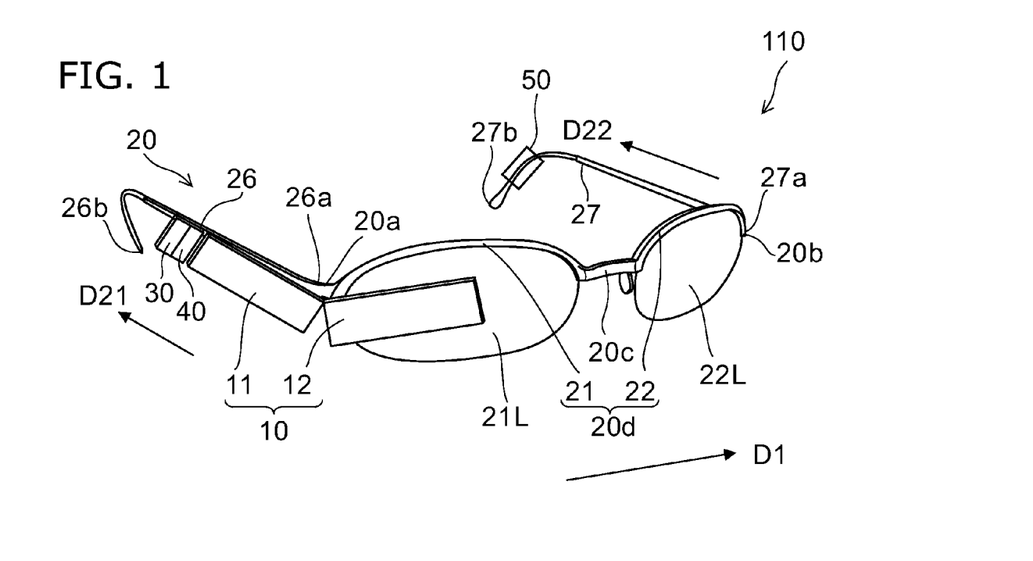
FIG. 1 is a schematic perspective view illustrating a head mounted display according to a first embodiment.

FIG. 1 is a schematic perspective view illustrating a head mounted display 110 according to a first embodiment.

Figure 2:
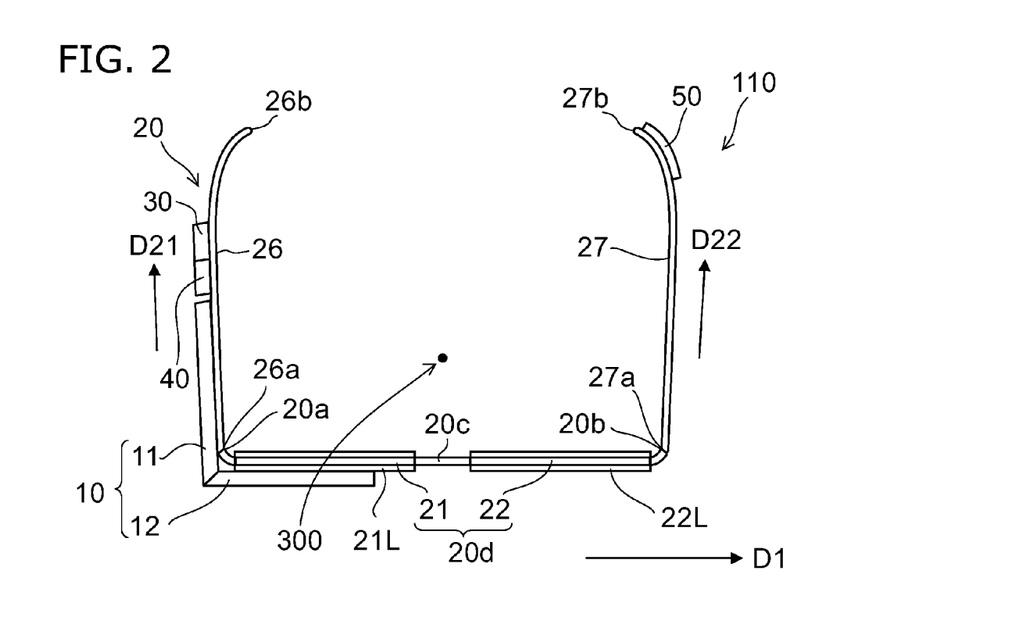
FIG. 2 is a schematic plan view illustrating the head mounted display according to the first embodiment.

FIG. 2 is a schematic plan view illustrating the head mounted display 110 according to the first embodiment.

Figure 3:
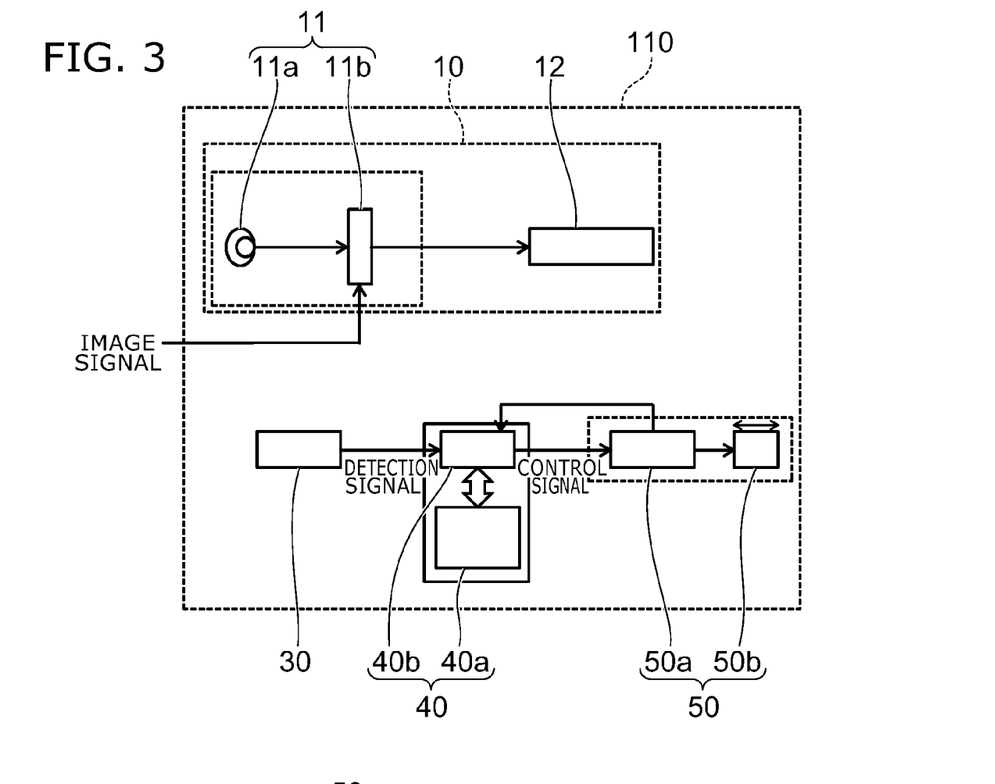
FIG. 3 is a schematic configuration view illustrating the head mounted display according to the first embodiment.

FIG. 3 is a schematic configuration view illustrating the head mounted display 110 according to the first embodiment.

As shown in FIGS. 1 to 3, the head mounted display 110 according to the first embodiment includes an image display device 10, a holder 20, a detector 30, a controller 40, and an adjustment part 50.

The holder 20 can be e.g. part of a pair of glasses. Alternatively, the holder 20 can be e.g. a pair of glasses.

The image display device 10 is provided on the holder 20.

First, the holder 20 is illustrated.

The holder 20 includes a holding member 20d, a first extending part 26, and a second extending part 27. The holding member 20d can be e.g. a portion holding the lenses of the glasses.

The holding member 20d extends in a direction D1 (corresponding to an example of the first direction). The direction D1 corresponds to the user's left-right direction. The holding member 20d has a first end 20a and a second end 20b. The second end 20b is spaced from the first end 20a in the direction D1. The holding member 20d has a midpoint 20c in the direction D1.

The holding member 20d includes a first portion 21 and a second portion 22.

The first portion 21 is located between the midpoint 20c and the first end 20a. The second portion 22 is located between the midpoint 20c and the second end 20b.

The first portion 21 may include a first transmissive part 21L. The second portion 22 may include a second transmissive part 22L. The first transmissive part 21L and the second transmissive part 22L can include a lens for vision correction. Furthermore, the first transmissive part 21L and the second transmissive part 22L can include a filter for attenuating light. That is, the holder 20 can be e.g. vision correction glasses or sunglasses.

The first extending part 26 is connected to the first end 20a of the holding member 20d. The first extending part 26 extends in a direction D21 crossing the direction D1. The first extending part 26 includes an end part 26a and an end part 26b. The end part 26a is connected to the first end 20a. The end part 26b is spaced from the end part 26a in the direction D21. The first extending part 26 can be e.g. a fixing part for the right ear of the glasses. That is, the first extending part 26 can be e.g. a right temple part of the glasses. The direction D21 substantially corresponds to the user's front-back direction.

The second extending part 27 is connected to the second end 20b of the holding member 20d. The second extending part 27 extends in a direction D22 crossing the direction D1. The second extending part 27 is juxtaposed with the first extending part 26 in the direction D1. The second extending part 27 includes an end part 27a and an end part 27b. The end part 27a is connected to the second end 20b. The end part 27b is spaced from the end part 27a in the direction D22. The second extending part 27 can be e.g. a fixing part for the left ear of the glasses. That is, the second extending part 27 can be e.g. a left temple part of the glasses. The direction D22 substantially corresponds to the user's front-back direction.

The direction D21 and the direction D22 do not need to be exactly parallel to each other. For instance, the direction D21 and the direction D22 may be directions in which the end part 26b of the first extending part 26 and the end part 27b of the second extending part 27 are spaced from each other, or come close to each other.

Next, the image display device 10 is illustrated.

The image display device 10 is attached to e.g. the holder 20.

The image display device 10 illustrated in FIGS. 1 and 2 is attached to the right side (the first portion 21 side) of the holder 20.

Alternatively, the image display device 10 may be attached to the left side (the second portion 22 side) of the holder 20.

In the following, the case where the image display device 10 is attached to the right side (the first portion 21 side) of the holder 20 is illustrated.

In the case where the image display device 10 is attached to the left side (the second portion 22 side) of the holder 20, the following description also holds by interchanging the first portion 21 with the second portion 22.

As shown in FIG. 3, the image display device 10 includes a projector 11 and an optical part 12. The projector 11 emits light including image information based on an inputted image signal.

The projector 11 includes a light source 11a and an image element part 11b.

The light source 11a emits light toward the image element part 11b. The light source 11a can be e.g. a light emitting diode or laser diode. However, the light source 11a is not limited to those illustrated, but can be modified appropriately.

The image element part 11b is externally inputted with an image signal. The image signal may be inputted to the image element part 11b through a wiring, not shown, or by radio waves, light or the like.

The image element part 11b forms an image based on the inputted image signal.

The image element part 11b can be e.g. a display device including LCD (liquid crystal display), LCOS (liquid crystal on silicon), or MEMS shutter (microelectromechanical systems shutter). However, the image element part 11b is not limited to those illustrated, but can be modified appropriately.

The projector 11 can be appropriately provided with an optical element such as an optical lens and mirror as necessary.

The light emitted from the light source 11a turns into light including image information by being incident on the image element part 11b. The light including image information emitted from the projector 11 is incident on the optical part 12.

The optical part 12 reflects the light including image information emitted from the projector 11, and changes the traveling direction of the light to a direction crossing the direction D1. For instance, the optical part 12 changes the traveling direction of the light including image information emitted from the projector 11 to the direction of an eye (in the case of this embodiment, the right eye) of the user. The light including image information with the traveling direction changed by the optical part 12 is incident on the user's eye. Thus, the user can view the image information included in the light emitted from the projector 11.

Thus, the head mounted display 110 makes the light including image information incident on one eye of the user.

The projector 11 and the optical part 12 are placed outside the holder 20. For instance, the projector 11 and the optical part 12 are placed outside the region defined by the holding member 20d, the first extending part 26, and the second extending part 27.

The projector 11 is attached to e.g. the first extending part 26 (e.g., the right temple part). The optical part 12 is attached to e.g. the first portion 21.

Thus, the image display device 10 is provided on one side (in this example, the right side) in the left-right direction of the holder 20. This makes the weight of one side (e.g., the right side) heavier than the weight of the other side (e.g., the left side). An excessive difference in weight between the two sides may bring significant discomfort to the user. The occurrence of discomfort hampers long-term use.

In this case, the discomfort can be alleviated by adjusting the position of the barycenter of the head mounted display 110 by providing a weight. The position of the weight may be appropriate when wearing the head mounted display. However, when the user moves the head, the position may become inappropriate. Furthermore, the user may have no idea about the amount of displacement of the weight that makes the weight balance appropriate.

Thus, the head mounted display 110 according to this embodiment further includes a detector 30, a controller 40, and an adjustment part 50 to suppress discomfort during use of the head mounted display 110.

Next, the detector 30, the controller 40, and the adjustment part 50 are illustrated.

The detector 30 detects position information and the like of the head mounted display 110. For instance, the detector 30 detects the tilt of the holder 20 caused by the movement of the head and outputs a detection signal corresponding to the tilt of the holder 20. The detection signal outputted from the detector 30 is inputted to the controller 40.

The detector 30 can be e.g. a gyroscope. In this case, the detector 30 can be a nine-axis gyroscope including a three-axis gyroscope, a three-axis acceleration sensor, and a three-axis inclination sensor. However, the detector 30 is not limited to those illustrated, but can be modified appropriately.

The installation position of the detector 30 is not particularly limited. For instance, the detector 30 can be provided on the end part 26b side of the first extending part 26.

The detector 30 can be provided in a plurality.

The controller 40 calculates the optimal position of the weight 50b depending on the tilt of the holder 20.

The controller 40 includes a storage 40a and a calculator 40b (corresponding to an example of the first calculator).

The storage 40a stores e.g. information on the relationship between the tilt of the holder 20 and the optimal position of the weight 50b.

For instance, the weight balance of the head mounted display 110 can be optimized by changing the position of the weight 50b depending on the tilt of the holder 20.

Thus, for instance, the relationship between the tilt of the holder 20 and the optimal position of the weight 50b is previously calculated, and the calculated information is stored in the storage 40a. The relationship between the tilt of the holder 20 and the optimal position of the weight 50b can be calculated by performing experiments, simulations and the like.

The calculator 40b calculates the optimal position of the weight 50b based on the tilt of the holder detected by the detector 30, the information from the storage 40a, and the information from the adjustment part 50 described below.

The information on the optimal position of the weight 50b is outputted as a control signal toward the movement part 50a of the adjustment part 50.

The installation position of the controller 40 is not particularly limited. For instance, the controller 40 can be provided on the end part 26b side of the first extending part 26.

The adjustment part 50 includes a movement part 50a and a weight 50b.

The movement part 50a changes the position of the weight 50b so as to optimize the weight balance of the head mounted display 110 based on the optimal position calculated by the calculator 40b.

The movement direction of the weight 50b can be the extending direction of the portion provided with the adjustment part 50. For instance, as shown in FIGS. 1 and 2, in the case where the adjustment part 50 is provided on the second extending part 27, the movement direction of the weight 50b can be the extending direction of the second extending part 27 (e.g., the direction D22). This can downsize the head mounted display 110.

The weight 50b is preferably formed from a material having a large specific weight. The weight 50b can be formed from e.g. metal.

The adjustment part 50 outputs the information on the position of the weight 50b toward the calculator 40b. The information on the position of the weight 50b outputted from the adjustment part 50 is used in the calculator 40b as information on the current position of the weight 50b.

The weight 50b is preferably provided on the opposite side from the image display device 10 across the barycenter 300 of the holder 20. This facilitates controlling the weight balance of the head mounted display 110. For instance, in the case where the image display device 10 is attached to the right side (the first portion 21 side) of the holder 20, the weight 50b is preferably provided near the end part 27b of the second extending part 27.

Figure 4:
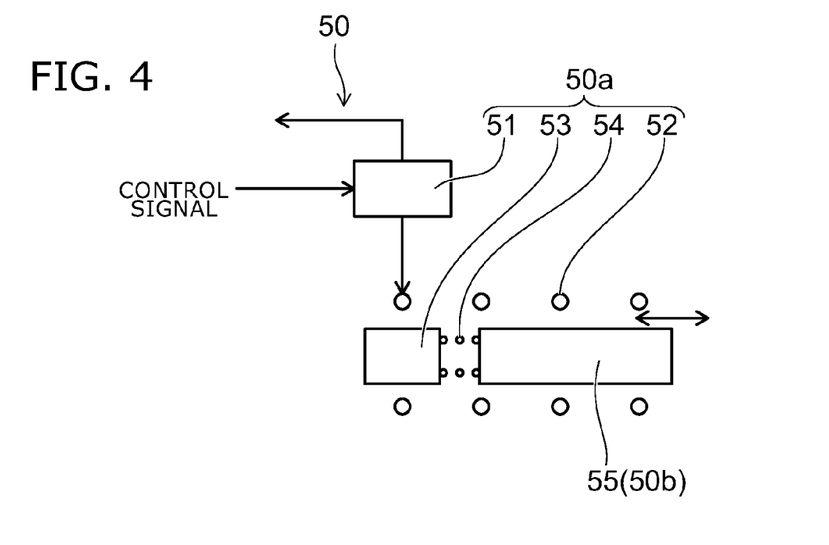
FIG. 4 is a schematic configuration view illustrating the adjustment part.

FIG. 4 is a schematic configuration view illustrating the adjustment part 50.

FIG. 4 illustrates the adjustment part 50 using a proportional solenoid.

As shown in FIG. 4, the adjustment part 50 includes a driving controller 51 (corresponding to an example of the first controller), a coil 52, a fixed iron core 53, and a spring 54 (corresponding to an example of the elastic body) constituting the movement part 50a, and a movable iron core 55 constituting the weight 50b.

In this case, the fixed iron core 53 can be a member including a magnetic material (e.g., iron).

The movable iron core 55 constituting the weight 50b can be a member including a magnetic material (e.g., iron).

The driving controller 51 controls the value of the current passed in the coil 52 based on the optimal position calculated by the calculator 40b.

The fixed iron core 53 and the movable iron core 55 are provided opposite to each other.

The spring 54 is provided between the fixed iron core 53 and the movable iron core 55.

The coil 52 is provided outside the fixed iron core 53 and the movable iron core 55.

When a current is passed in the coil 52 by the driving controller 51, a magnetic circuit is formed in the fixed iron core 53 and the movable iron core 55. This generates an attractive force proportional to the value of the current passed in the coil 52.

Thus, the position of the movable iron core 55 (weight 50b) can be changed by controlling the value of the current passed in the coil 52 by the driving controller 51.

In the case where no current flows in the coil 52, the movable iron core 55 is returned to a prescribed position by the spring 54.

Figure 5:
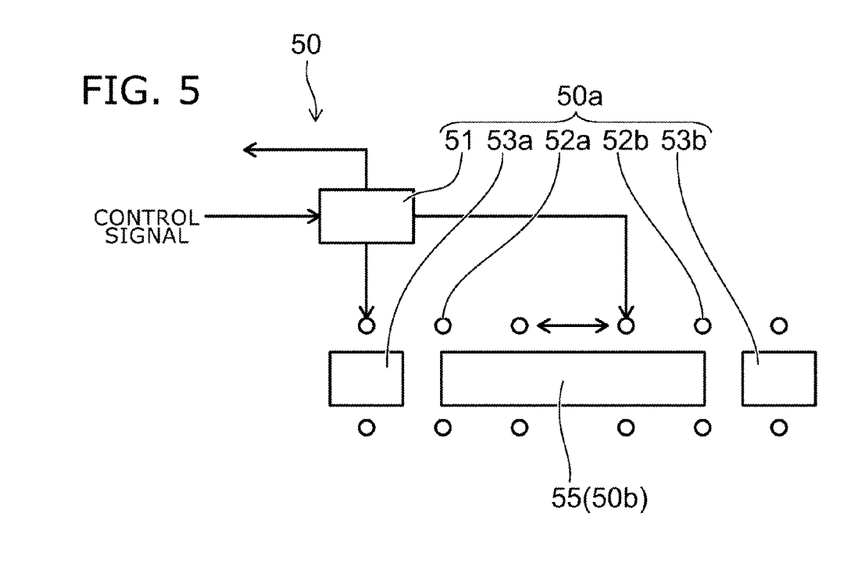
FIG. 5 is a schematic configuration view illustrating an adjustment part according to an alternative embodiment.

FIG. 5 is a schematic configuration view illustrating an adjustment part 50 according to an alternative embodiment.

FIG. 5 illustrates the adjustment part 50 using a bidirectional proportional solenoid.

As shown in FIG. 5, the adjustment part 50 includes a driving controller 51 (corresponding to an example of the second controller), a coil 52a (corresponding to an example of the first coil), a coil 52b (corresponding to an example of the second coil), a fixed iron core 53a (corresponding to an example of the first member), and a fixed iron core 53b (corresponding to an example of the second member) constituting the movement part 50a, and a movable iron core 55 constituting the weight 50b.

In this case, the fixed iron core 53a, 53b can be a member including a magnetic material (e.g., iron).

The movable iron core 55 constituting the weight 50b can be a member including a magnetic material (e.g., iron).

The driving controller 51 controls the value of the current passed in the coil 52a and the coil 52b based on the optimal position calculated by the calculator 40b.

The fixed iron core 53a, the movable iron core 55, and the fixed iron core 53b are provided opposite to each other.

The coil 52a is provided outside the fixed iron core 53a and the movable iron core 55.

The coil 52b is provided outside the fixed iron core 53b and the movable iron core 55.

When a current is passed in the coil 52a by the driving controller 51, a magnetic circuit is formed in the fixed iron core 53a and the movable iron core 55. This generates an attractive force proportional to the value of the current passed in the coil 52a.

When a current is passed in the coil 52b by the driving controller 51, a magnetic circuit is formed in the fixed iron core 53b and the movable iron core 55. This generates an attractive force proportional to the value of the current passed in the coil 52b.

Thus, the position of the movable iron core 55 (weight 50b) can be changed by controlling the value of the current passed in the coil 52a and the coil 52b by the driving controller 51.

Figure 6:
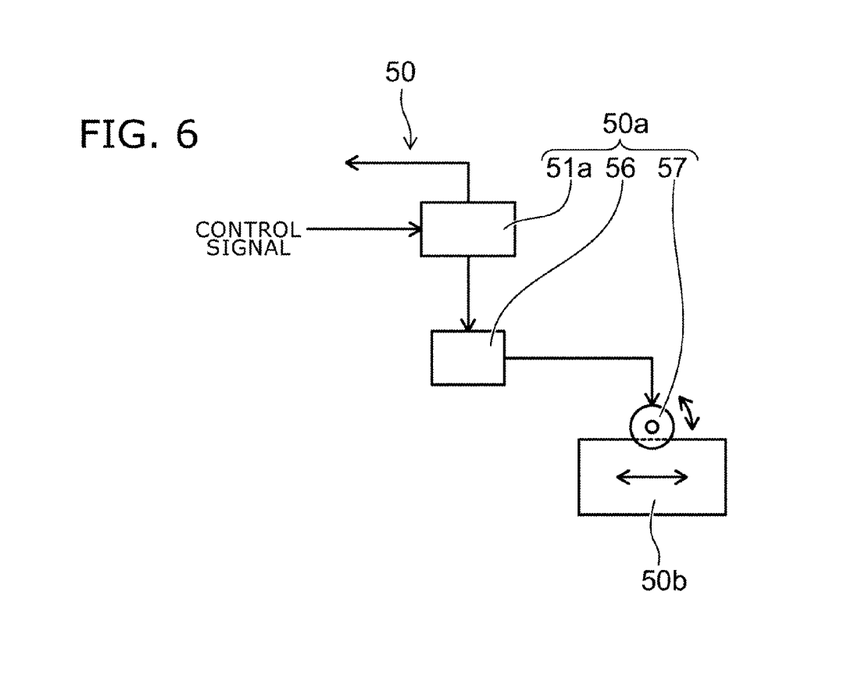
FIG. 6 is a schematic configuration view illustrating an adjustment part according to an alternative embodiment.

FIG. 6 is a schematic configuration view illustrating an adjustment part 50 according to an alternative embodiment.

As shown in FIG. 6, the adjustment part 50 includes a driving controller 51a (corresponding to an example of the third controller), a driver 56, and a transmitter 57 constituting the movement part 50a, and a weight 50b.

The driving controller 51a controls the driver 56 based on the optimal position calculated by the calculator 40b.

The driver 56 can be e.g. a control motor such as a pulse motor and servomotor.

The transmitter 57 transmits the power from the driver 56 to the weight 50b. The transmitter 57 can be e.g. a roller.

The driver 56 and the transmitter 57 may be connected directly, or connected through a transmission member such as gears.

The transmitter 57 can be a pinion, and the weight 50b can be a rack.

For instance, the position of the weight 50b can be changed by controlling the number of rotations or rotation angle of the 56 being a control motor by the driving controller 51a.

Figure 7:
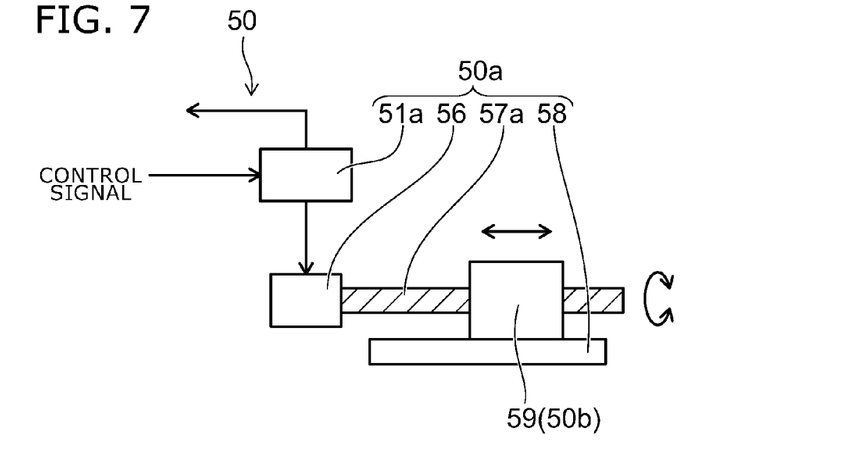
FIG. 7 is a schematic configuration view illustrating an adjustment part according to an alternative embodiment.

FIG. 7 is a schematic configuration view illustrating an adjustment part 50 according to an alternative embodiment.

As shown in FIG. 7, the adjustment part 50 includes a driving controller 51a, a driver 56, a transmitter 57a, and a guiding part 58 constituting the movement part 50a, and a nut 59 constituting the weight 50b.

The driving controller 51a controls the driver 56 based on the optimal position calculated by the calculator 40b.

The driver 56 can be e.g. a control motor such as a pulse motor and servomotor.

The transmitter 57a transmits the power from the driver 56 to the nut 59. The transmitter 57a can be e.g. a male screw.

The guiding part 58 hinders the nut 59 from rotating.

The nut 59 has a female screw mating with the transmitter 57a being the male screw.

For instance, the position of the nut 59 (weight 50b) can be changed by controlling the number of rotations or rotation angle of the driver 56 being a control motor by the driving controller 51a.

FIGS. 6 and 7 illustrate the cases where the position of the weight 50b is changed by using a rotary motor. However, the position of the weight 50b may be changed by using a linear motor.

Alternatively, a wire or the like is connected to the weight 50b, and the position of the weight 50b may be changed through the wire or the like.

Figure 8:
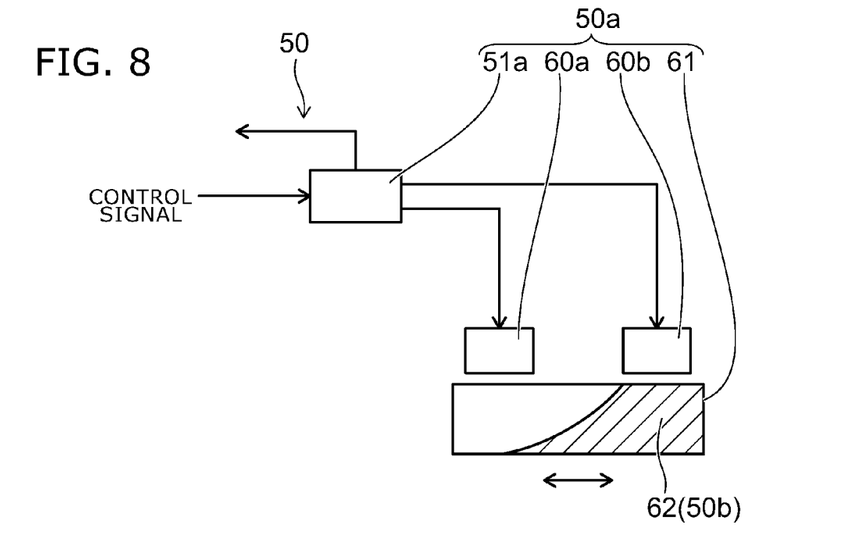
FIG. 8 is a schematic configuration view illustrating an adjustment part according to an alternative embodiment.

FIG. 8 is a schematic configuration view illustrating an adjustment part 50 according to an alternative embodiment.

As shown in FIG. 8, the adjustment part 50 includes a driving controller 51b (corresponding to an example of the fourth controller), a driver 60a (corresponding to an example of the first driver), a driver 60b (corresponding to an example of the second driver), and a container 61 constituting the movement part 50a, and a magnetic body 62 constituting the weight 50b.

The driving controller 51b controls the drivers 60a, 60b based on the optimal position calculated by the calculator 40b.

The drivers 60a, 60b can be e.g. an electromagnet.

The container 61 houses the magnetic body 62.

The magnetic body 62 has magnetism and fluidity. The magnetic body 62 can be e.g. a magnetic fluid.

For instance, the position of the magnetic body 62 (weight 50b) placed inside the container 61 can be changed by controlling the drivers 60a, 60b being electromagnets by the driving controller 51b.

Alternatively, the driver can be a permanent magnet. Then, the position of the magnetic body 62 (weight 50b) placed inside the container 61 may be changed by controlling the relative position of the permanent magnet and the container 61.

As an example, the foregoing illustrates the case where two drivers are provided. However, the accuracy of positional control of the magnetic body 62 (weight 50b) can be improved by increasing the number of drivers.

The configuration of the adjustment part 50 is not limited to those illustrated above. Any configuration of the adjustment part 50 is possible as long as the position of the weight 50b is changed based on the optimal position calculated by the calculator 40b.

Second Embodiment

Figure 9:
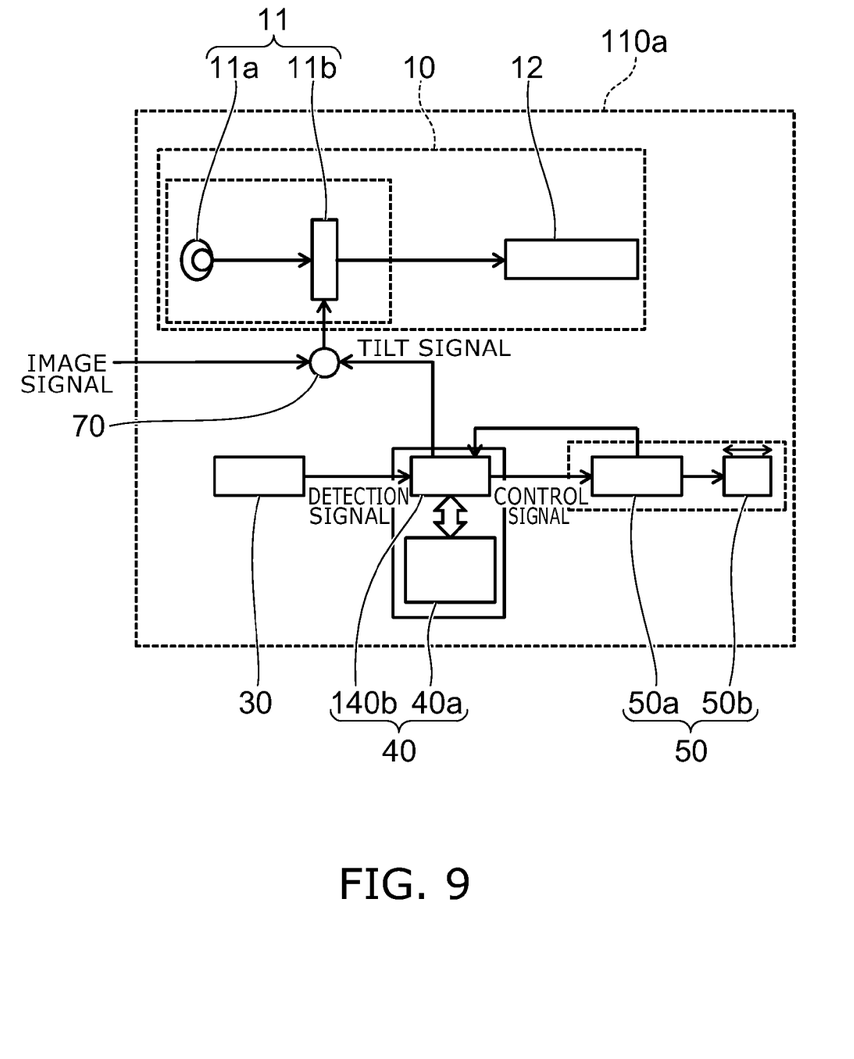
FIG. 9 is a schematic configuration view illustrating a head mounted display according to a second embodiment.

FIG. 9 is a schematic configuration view illustrating a head mounted display 110a according to a second embodiment.

As shown in FIG. 9, the head mounted display 110a according to the second embodiment includes an image display device 10, a detector 30, a controller 140, an adjustment part 50, and an image processor 70.

Furthermore, like the head mounted display 110 illustrated in FIGS. 1 and 2, the head mounted display 110a also includes a holder 20.

The image display device 10 is provided on the holder 20. For instance, as in the head mounted display 110, the image display device 10 is attached to the right side (the first portion 21 side) of the holder 20.

As in the head mounted display 110, the image display device 10 includes a projector 11 and an optical part 12. The projector 11 includes a light source 11a and an image element part 11b.

The adjustment part 50 includes a movement part 50a and a weight 50b.

Here, if the holder 20 is tilted, the user views a tilted image depending on the tilt of the holder 20. This causes discomfort.

Thus, in the head mounted display 110a according to the second embodiment, in addition to controlling the weight balance of the head mounted display 110a similarly to that described above, the image signal is corrected so as to suppress the tilt of the image viewed by the user.

The controller 140 provided in the head mounted display 110a according to the second embodiment includes a storage 40a and a calculator 140b (corresponding to an example of the first calculator).

The controller 140 calculates the optimal position of the weight 50b depending on the tilt of the holder 20.

Furthermore, the controller 140 outputs information on the tilt of the holder 20 toward the image processor 70.

For instance, the calculator 140b calculates the optimal position of the weight 50b based on the tilt of the holder detected by the detector 30, the information from the storage 40a, and the information from the adjustment part 50.

The information on the optimal position of the weight 50b is outputted as a control signal toward the movement part 50a of the adjustment part 50.

Furthermore, the calculator 140b calculates the tilt of the holder 20 based on the position information detected by the detector 30. The information on the calculated tilt of the holder 20 is outputted as a tilt signal toward the image processor 70.

The image processor 70 is inputted with an external image signal, and the tilt of the holder calculated by the calculator 140b.

The image processor 70 corrects the information on the tilt of the image in the image signal so as to suppress the tilt of the image viewed by the user based on the tilt signal.

The image signal corrected by the image processor 70 is outputted toward the image element part 11b.

The image element part 11b forms an image based on the corrected image signal.

Thus, the user can view a blur-free image even when the head is moved, e.g. during walking.

The head mounted display 110a according to the second embodiment can control the weight balance of the head mounted display 110a and suppress the tilt of the image viewed by the user. This can further suppress discomfort during use of the head mounted display 110a.

Third Embodiment

Figure 10:
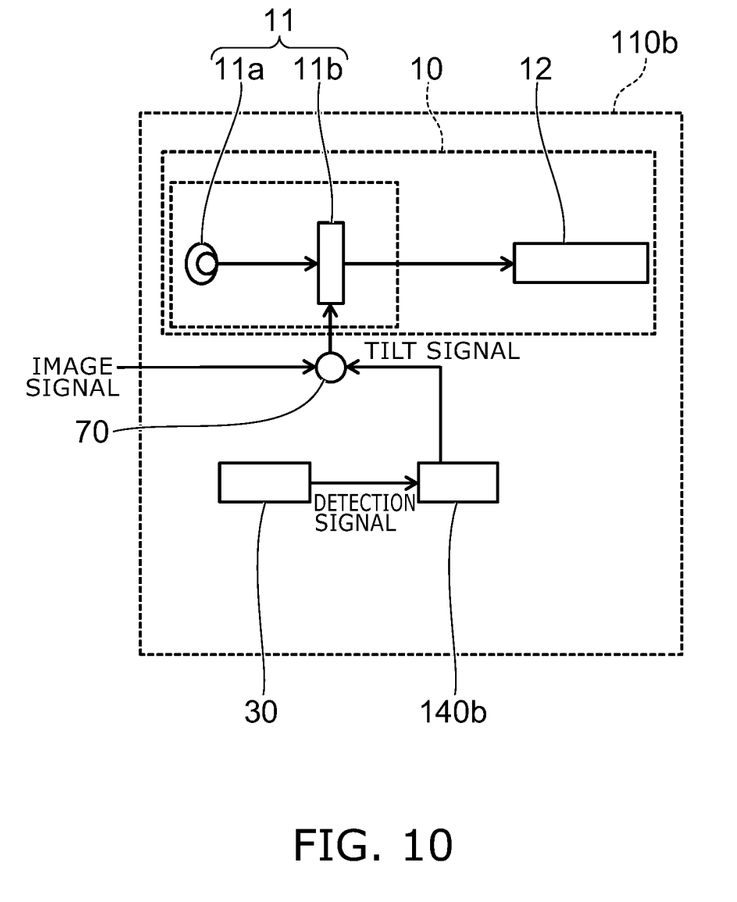
FIG. 10 is a schematic configuration view illustrating a head mounted display according to a third embodiment.

FIG. 10 is a schematic configuration view illustrating a head mounted display 110b according to a third embodiment.

As shown in FIG. 10, the head mounted display 110b according to the third embodiment includes an image display device 10, a detector 30, a calculator 140b, and an image processor 70.

Furthermore, like the head mounted display 110 illustrated in FIGS. 1 and 2, the head mounted display 110b also includes a holder 20.

The head mounted display 110b according to the third embodiment does not include the adjustment part 50 described above.

Thus, the head mounted display 110b does not include the storage 40a for storing information on the optimal position of the weight 50b with respect to the tilt of the holder 20, either.

The head mounted display 110b according to the third embodiment can suppress the tilt of the image viewed by the user like the head mounted display 110a described above.

This can suppress discomfort during use of the head mounted display 110b.

Furthermore, the head mounted display 110b can be reduced in weight and size.

Fourth Embodiment

Figure 11:
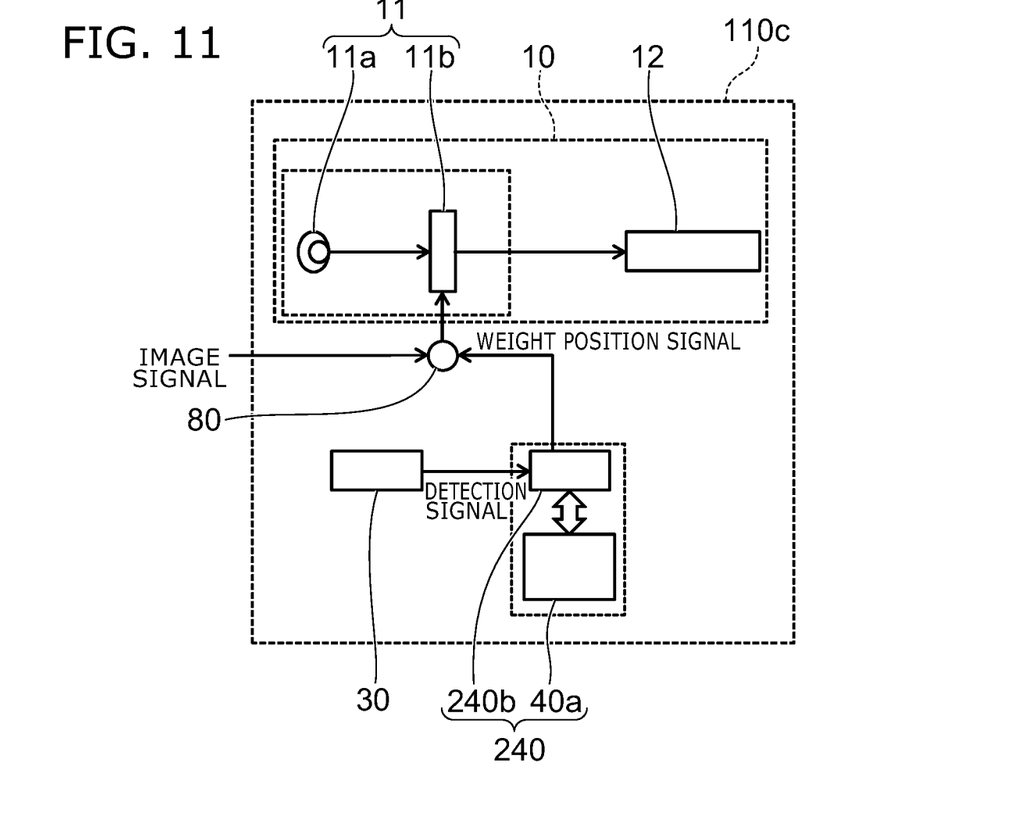
FIG. 11 is a schematic configuration view illustrating a head mounted display according to a fourth embodiment.

FIG. 11 is a schematic configuration view illustrating a head mounted display 110c according to a fourth embodiment.

Figure 12:
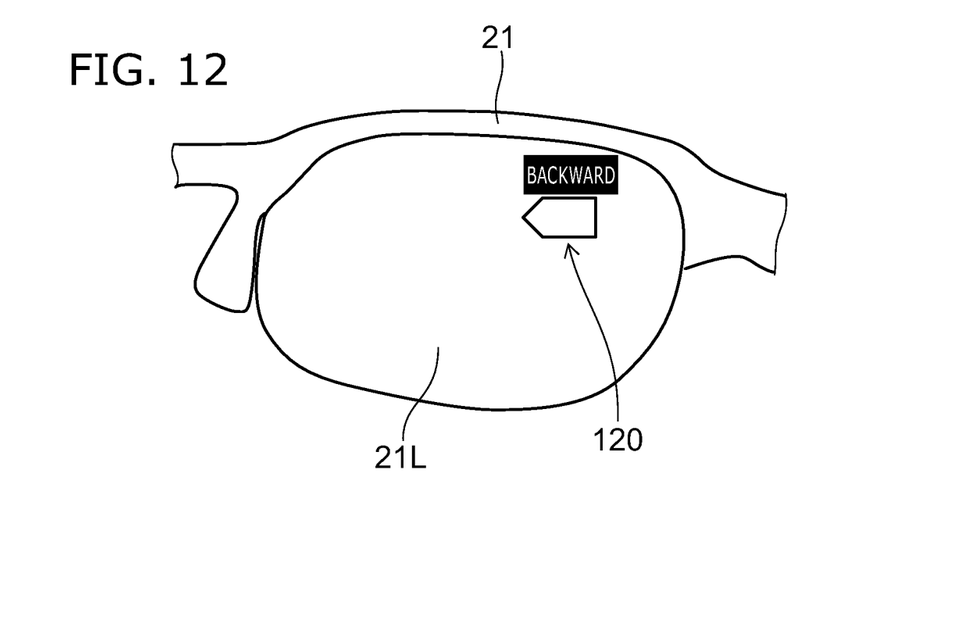
FIG. 12 is a schematic view illustrating a weight position change indication image viewed by the user.

FIG. 12 is a schematic view illustrating a weight position change indication image viewed by the user.

As shown in FIG. 11, the head mounted display 110c according to the fourth embodiment includes an image display device 10, a detector 30, a controller 240, and an image signal superimposing part 80.

Furthermore, like the head mounted display 110 illustrated in FIGS. 1 and 2, the head mounted display 110c also includes a holder 20.

The head mounted display 110c according to the fourth embodiment does not include the adjustment part 50 described above.

However, the movable weight 50b is provided.

The weight 50b is configured so that the installation position can be changed by e.g. selection of one of a plurality of fastening positions or movement along a guide.

The weight 50b is preferably provided on the opposite side from the image display device 10 across the barycenter 300 of the holder 20. This facilitates controlling the weight balance of the head mounted display 110c. For instance, in the case where the image display device 10 is attached to the right side (the first portion 21 side) of the holder 20, the weight 50b is preferably provided near the end part 27b of the second extending part 27.

The controller 240 calculates the optimal position of the weight 50b depending on the tilt of the holder 20 and creates information on the weight position change indication image 120.

The controller 240 includes a storage 40a and a calculator 240b (corresponding to an example of the second calculator).

The calculator 240b calculates the optimal position of the weight 50b based on the tilt of the holder detected by the detector 30, and the information from the storage 40a.

Furthermore, the calculator 240b calculates information on the weight position change indication image 120 based on the calculated optimal position of the weight 50b. The created information on the weight position change indication image 120 is outputted as a weight position signal (a signal about the weight position change indication image 120) toward the image signal superimposing part 80.

The image signal superimposing part 80 is inputted with an external image signal, and the information on the weight position from the calculator 240b.

The image signal superimposing part 80 superimposes the inputted image signal and weight position signal for output toward the image element part 11b.

The image element part 11b forms an image based on the image signal and the weight position signal.

The optical part 12 reflects the light including the weight position change indication image 120 emitted from the image element part 11b, and changes the traveling direction of the light to the direction of an eye (e.g., the right eye) of the user.

The weight position change indication image 120 can be presented to the user e.g. as shown in FIG. 12.

The user can change the position of the weight 50b based on the weight position change indication image 120. Thus, the user can easily adjust the position of the weight 50b.

The head mounted display 110c according to the fourth embodiment can facilitate adjusting the weight balance of the head mounted display 110c.

This can suppress discomfort during use of the head mounted display 110c.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A head mounted display comprising:
   a holder including:
      a frame; and
      a first and a second temples respectively connected to each end part of the frame;
   a projector provided on the first temple and emitting light;
   an optical part provided on the frame and reflecting at least part of the light emitted from the projector;
   a weight provided on opposite side of the projector;
   a detector which detects tilt of the holder;
   a first calculator which calculates an optimal position of the weight based on the tilt of the holder; and
   a movement part which changes the position of the weight according to the optimal position.

2. The display according to claim 1, wherein
   the weight includes a magnetic material,
   the movement part changes the position of the weight by generating magnetic field.

3. The display according to claim 2, wherein
   the movement part includes a coil, and a controller that controls a current supplied to the coil according to the optimal position.

4. The display according to claim 1, wherein the movement part includes:
   a driver that generates power;

a transmitter that transmits the power to the weight; and
a third controller that controls the driver according to the optimal position.

5. The display according to claim 4, wherein the transmitter includes a roller.

6. The display according to claim 4, wherein
the transmitter is a pinion, and
the weight is a rack.

7. The display according to claim 4, wherein
the transmitter is a male screw, and
the weight is a nut.

8. The display according to claim 7, further comprising:
a guiding part that hinders the nut from rotating.

9. The display according to claim 4, wherein the transmitter is a wire.

10. The display according to claim 1, wherein the movement part includes:
a linear motor that changes the position of the weight; and
a controller that controls the linear motor based on the signal from the first calculator.

11. The display according to claim 1, wherein
the weight is magnetic fluid, and
the movement part changes the position of the weight by generating magnetic field.

12. The display according to claim 11, wherein
the movement part includes electromagnets, and
a controller that controls at least one of currents supplied to electromagnets.

13. The display according to claim 11, wherein
the movement part includes permanent magnets, and
the fourth controller controls at least one of a relative position of permanent magnets.

14. The display according to claim 1, wherein
an image processor that corrects an image to be projected by the projector based on the tilt of the frame.

15. The display according to claim 14, wherein the image processor corrects a tilt of the image to be projected by the projector.

16. The display according to claim 1, wherein the movement part changes the position of the weight in a direction crossing the frame.

17. The display according to claim 1, wherein the weight is provided on the second temple.

18. The display according to claim 1, wherein the weight is closer to one end part of the second temple than the other end part of the second temple connected to the frame.

19. The display according to claim 1,
further comprising a storage that stores relationship between the tilt of the holder and the optimal position of the weight: and
wherein the first calculator calculates the optimal position by referring to the storage.

* * * * *